US012205441B2

(12) United States Patent
Acres et al.

(10) Patent No.: US 12,205,441 B2
(45) **Date of Patent: *Jan. 21, 2025**

(54) METHOD FOR ISOLATING PLAYERS OF ELECTRONIC GAMING MACHINES ON A NETWORK OF ELECTRONIC GAMING MACHINES

(71) Applicants: Acres Technology, Las Vegas, NV (US); James Acres, Las Vegas, NV (US)

(72) Inventors: John F. Acres, Las Vegas, NV (US); James Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,474

(22) Filed: Mar. 2, 2023

(65) Prior Publication Data

US 2023/0351856 A1 Nov. 2, 2023

Related U.S. Application Data

(63) Continuation of application No. 17/496,142, filed on Oct. 7, 2021, now Pat. No. 11,620,874, which is a (Continued)

(51) Int. Cl.

*G07F 17/32* (2006.01)
*G07F 17/34* (2006.01)

(52) U.S. Cl.

CPC ...... *G07F 17/3269* (2013.01); *G07F 17/3209* (2013.01); *G07F 17/3211* (2013.01); (Continued)

(58) Field of Classification Search

CPC ............. G07F 17/3269; G07F 17/3209; G07F 17/3211; G07F 17/3223; G07F 17/3239; (Continued)

(56) References Cited

U.S. PATENT DOCUMENTS 10,850,184 B1 12/2020 Colvin et al.
11,158,168 B1 10/2021 Acres et al.
(Continued)

OTHER PUBLICATIONS

Meredith Carothers and Chrystal Okonta, Clean THEN Sanitize: A One-Two Punch to Stop Foodborne Illness in the Kitchen, Aug. 27, 2019, USDA, available at <<https://www.usda.gov/media/blog/2019/08/27/clean-then-sanitize-one-two-punch-stop-foodborne-illness-kitchen>>. (Year: 2019).*
(Continued)

*Primary Examiner* — Werner G Garner
(74) *Attorney, Agent, or Firm* — Ballard Spahr LLP

(57) ABSTRACT

Embodiments of the present invention are directed to gaming system including a plurality of networked electronic gaming machines and a wireless network that communicates with mobile devices carried by attendants. The system detects when an electronic gaming machine is engaged by a player and disables at least one adjacent electronic gaming machine. When the player disengages from the electronic gaming machine, it is disabled and an attendant is dispatched to the electronic gaming machine via their mobile device to implement a cleaning protocol. When the cleaning protocol is completed, the attendant so indicates via an input on the mobile computing device, and the electronic gaming device is enabled for play.

20 Claims, 4 Drawing Sheets

Related U.S. Application Data continuation of application No. 16/866,267, filed on May 4, 2020, now Pat. No. 11,158,168.

(60) Provisional application No. 63/019,123, filed on May 1, 2020.

(52) U.S. Cl.
CPC ...... *G07F 17/3223* (2013.01); *G07F 17/3239* (2013.01); *G07F 17/3241* (2013.01); *G07F 17/3244* (2013.01); *G07F 17/34* (2013.01)

(58) Field of Classification Search
CPC ... G07F 17/3241; G07F 17/3244; G07F 17/34
See application file for complete search history.

(56) References Cited

U.S. PATENT DOCUMENTS

| | | | |
|---|---|---|---|
| 2004/0082384 | A1 | 4/2004 | Walker et al. |
| 2010/0016052 | A1 | 1/2010 | Gagner et al. |
| 2010/0274640 | A1 | 10/2010 | Morey et al. |
| 2017/0186270 | A1 | 6/2017 | Acres |
| 2020/0342710 | A1 | 10/2020 | Acres et al. |

OTHER PUBLICATIONS

How To Clean and Disinfect Schools to Help Slow the Spread of Flu, Jul. 31, 2018, Centers for Disease Control, downloaded from <<https://web.archive.org/web/20200430061548/https://www.cdc.gov/flu/school/cleaning.htm>>. (Year: 2018).*

* cited by examiner

METHOD FOR ISOLATING PLAYERS OF ELECTRONIC GAMING MACHINES ON A NETWORK OF ELECTRONIC GAMING MACHINES

CROSS REFERENCE TO RELATED PATENT APPLICATIONS

This application is a continuation of U.S. patent application Ser. No. 17/496,142 filed Oct. 7, 2021, which is a continuation of U.S. patent application Ser. No. 16/866,267, filed May 4, 2020, now U.S. Pat. No. 11,158,168, which claims priority to U.S. Provisional Application No. 63/019,123 filed May 1, 2020, which are hereby incorporated by reference in their entirety.

FIELD OF THE INVENTION

The present application relates to systems for maintaining social isolation between and among players of networked electronic gaming machines, such as slot machines or video poker machines.

BACKGROUND

Such isolation might be desired by an operator of the networked gaming machines or by players for at least two reasons. First, a disease epidemic or pandemic creates conditions in which it is desirable for players to maintain social isolation from one another to prevent spreading disease. An operator might be inclined to provide such isolation on its own initiative or there might be a government mandate to ensure that players are isolated. Second, some players prefer to play on electronic gaming machine without other players being nearby. The operator of the gaming machines might be inclined to cater to such a player if she is a regular high-stakes gambler.

One way that is contemplated to provide isolation to all players, typically as a result of social isolation necessitated by a pandemic, is to simply disable, i.e., make unplayable, every other gaming machine. This could be accomplished by locking the machine, powering down, disabling software, or in any other manner that renders the gaming machine unplayable. Although this achieves the desired isolation it prevents players from choosing a machine of his or her choice. A player might well be frustrated if they discover that a favorite gaming machine is one of those that is disabled. Also, this method of isolation does not flexibly allow the operator to set the extent of the isolation. For example, rather than locking every other machine, which spaces the player two machines apart, it might be desirable to lock two machines on each side of a player to increase the distance between players to three machines apart. It may also be desirable to allow two or more adjacent electronic gaming machines to operate simultaneously if, for example, family members wished to play together.

It is also desirable, and may also be government mandated, for each gaming machine to be cleaned and disinfected immediately after it is played to protect the next player from disease. Floor attendants could be stationed around the floor to observe and clean each machine when a player finishes play and leaves a machine. But this is labor intensive and could result in machines that are not cleaned if the attendants do not notice a player has left a machine. Some casinos have thousands of machines, which could easily result in a missed machine. In addition, even if an attendant notices a player leaving, another nearby player could immediately begin play before the attendant can clean the machine.

In the case of a preferred gambler, it might even be desirable to permit the gambler to play one machine in a bank of machines and lock out all or some of the other machines in the bank or area. Although this could be done manually it is also labor intensive and consumes time to implement, time that the gambler might otherwise be playing.

DETAILED DESCRIPTION

The present development contemplates implementing an automated system that addresses these problems. The system is implemented in part using a Distributed System for Managing and Providing Services to Electronic Gaming Machines, like that disclosed in U.S. application Ser. No. 16/860,489 filed in the US Patent and Trademark Office on Apr. 28, 2020 (the "managing system"), and US Patent Application Publication 2017/0186270 for a Method and System for Dispatching Casino Personnel and Tracking Interaction with Players (the "dispatch system"), both of which are incorporated herein by reference for all purposes.

Figure 1A:
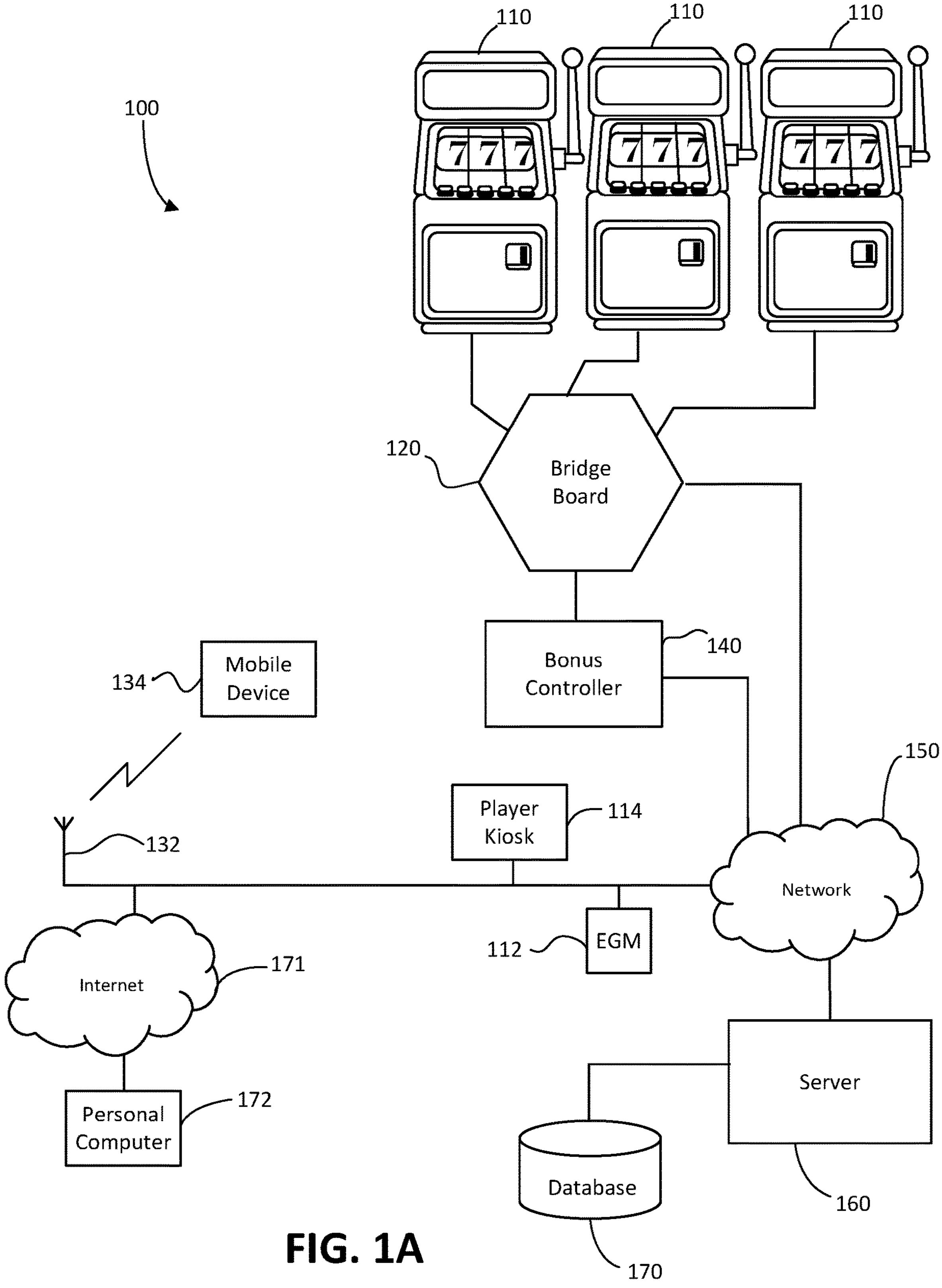
FIG. 1A is a system diagram showing a schematic depiction of a network of electronic gaming machines upon which the present development is implemented.

FIG. 1A is a system diagram illustrating various components of a gaming system according to embodiments of the invention. Referring to FIG. 1A, the gaming system 100 includes several gaming devices, also referred to as Electronic Gaming Machines (EGMs) 110 that are connected to a gaming network 150 through various communication mechanisms.

In general, a gaming network 150 connects any of a number of EGMs 10, or other gaming devices, such as those described below, for central management. Accounting and other functions may be served by a connected server 160 and database 170. For example, many player tracking functions, bonusing systems, and promotional systems may be centrally administrated from the server 160 and database 170. In some embodiments there may be multiple servers 160 and databases 170, each performing different functions. In other embodiments functions may be combined and operate on a single or small group of servers 160, each with their own database 170 or combined databases.

The EGMs 110 of FIG. 1A connect to the gaming network 150 through a bridge 120, which is more fully described in the managing system patent application. In general, the bridge 120 is a multi-protocol interface that monitors communication between the gaming network 150 and the EGM 110. In a common embodiment, the bridge 120 communicates to the EGM 110 through a standard gaming network port, using a standard gaming network protocol, SAS, which is well known in the gaming industry. Most modern games include at least one communication port, which is commonly a SAS port or a port for another communication protocol.

Some of EGMs 110 in FIG. 1A may connect to the gaming network 150 through a bonus controller 140, which may be coupled between the gaming network 150 and some of the gaming devices 110. The bonus controller 140 generally communicates through a non-SAS protocol, such as another well-known communication protocol known as GSA. GSA is typically carried over an Ethernet network, and thus the bonus controller 140 includes an Ethernet transceiver. The bonus controller 140 and/or the bridge 120 may create or convert data or information received according to a particular protocol, such as SAS, into data or information according to another protocol, such as GSA. In this way the bridge 120 and bonus controller 140 are equipped to communicate, seamlessly, between any EGM 110 and gaming network 150 no matter which communication protocols are in use. Further, because the bridge 120 and bonus controller 140 are programmable, and include multiple extensible communication methods, as described below, they are capable of communicating with EGMs 110 that will communicate using protocols and communication methods developed in the future. The functions implemented by any of the controllers mentioned herein might be distributed among a plurality of controllers.

Other games or devices on which games may be played are connected to the gaming network using other connection and/or communication methods. For instance, a player kiosk 114 may be directly coupled to the gaming network. The player kiosk 114 allows players, managers, or other personnel to access data on the gaming network 150, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 132 couples the gaming network 150 to a plurality of mobile computing devices, such as iPods manufactured by Apple Inc., one of which is shown at 134. The dispatch system, including the wireless network and how attendants are dispatched to identified electronic gaming devices is more fully explained in the dispatch patent publication.

The gaming network 150 also couples to the internet 171, which in turn is coupled to a number of computers, such as the personal computer 172 illustrated in FIG. 1A. The personal computer 172 may be used much like the kiosk 114, described above, to manage player tracking or other data kept on the gaming network 150. More likely, though, is that the personal computer 172 is used to play actual games in communication with the gaming network 150. Player data related to games and other functions performed on the personal computer 172 may be tracked as if the player were playing on an EGM 110.

In general, in operation, a player inserts a starting credit into one of the games, such as an EGM 110. The EGM 110 sends data through its SAS or other data communication port through the bridge 120, and in some cases via bonus controller 140, to the gaming network 150. Various servers 160 and databases 170 collect information about the gameplay on the EGM 110, such as wagers made, results, various pressing of the buttons on the EGM 110, for example. In addition, the SAS port on the EGM 110 may also be coupled, through the bridge 120 to other systems, such as player tracking systems, accounting, and ticketing systems, such as Ticket-In-Ticket-Out (TITO) systems.

In addition, the EGM 110 accepts information from systems external to the EGM itself to cause the EGM 110 to perform other functions. For example, these external systems may drive the EGM 110 to issue additional credits to the player. In another example, a promotional server may direct the EGM 110 to print a promotional coupon on the ticket printer of the EGM.

The bonus controller 140 is structured to perform some of the above-described functions as well. For example, in addition to standard games on the EGM 110, the bonus controller 140 is structured to drive the EGM 110 to pay bonus awards to the player based on any of the factors, or combination of factors, related to the EGM 110, the player playing the EGM 10, particular game outcomes of the game being played, or other factors.

In this manner, the combination of the bonus controller 140 and bridge 120 are a sub-system capable of interfacing with each of the EGMs on a gaming network 150. Through this interface, the bridge 120 may gather data about the game, gameplay, or player, or other data on the EGM 110, and forward it to the bonus controller 140. The bonus controller 140 then uses such collected data as input and, when certain conditions are met, sends information and/or data to the EGM 110 to cause it to perform certain functions.

Figure 1B:
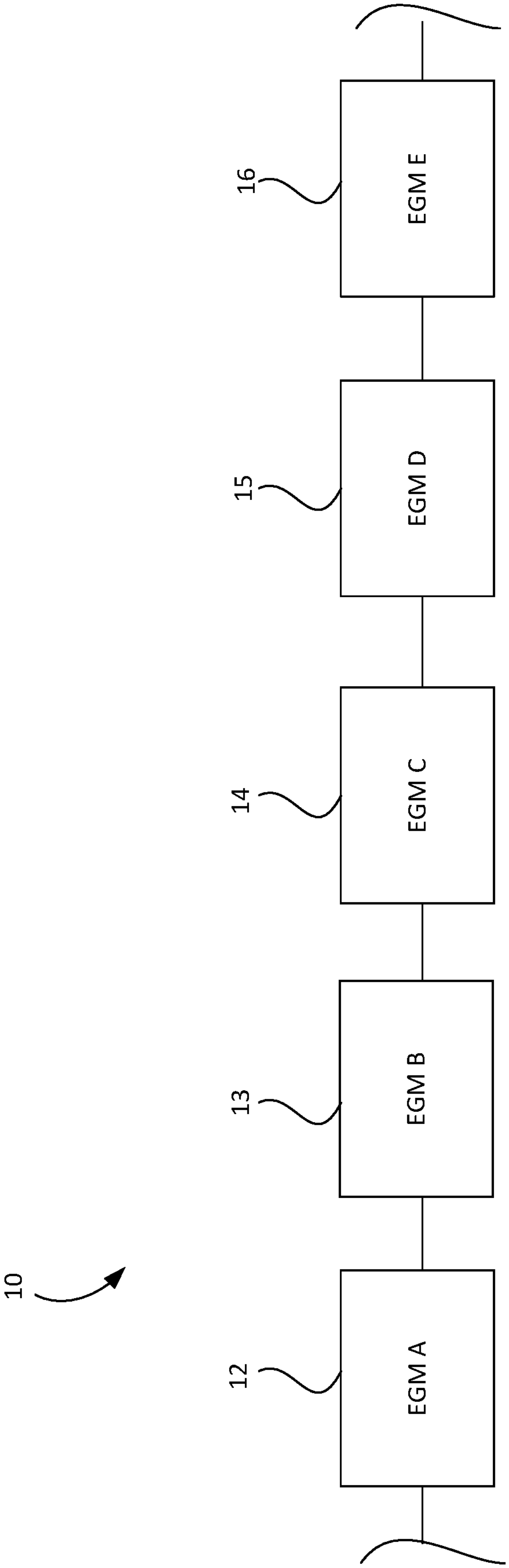
FIG. 1B is a schematic depiction of 5 of the gaming machines on the network of FIG. 1A.

In one embodiment of the present development, a computer implemented process is provided to implement the present development in cooperation with the dispatch and managing systems. One embodiment of such a system is shown in the accompanying FIG. 2 and another embodiment in FIG. 3. FIG. 1B is a schematic diagram of a bank of 5 electronic gaming machines on a network of gaming machines that also includes the systems for managing and dispatching.

Indicated generally at 10 FIG. 1B is a portion of the network of electronic gaming machines (EGMs) depicted in FIG. 1A. Shown therein is a row of EGMs 12, 13, 14, 15, and 16, EGM A, EGM B, EGM C, EGM D and EGM E, respectively, which together comprise a bank of EGMs on the casino floor. EGM A is on the left of EGM B, which is on the left of EGM C, which is on the left of EGM D, which is on the left of EGM E.

EGMs on the network are typically grouped in banks of two or more, forming a circular, linear or rectangular shape. When rectangular in shape, the back of one EGM typically faces the back of another. In FIG. 1B, only five machines in a bank on the network are shown, although as mentioned above, there may be thousands of EGMs on a network spread around a casino in banks of varying sizes and shapes.

A Disable list is created for each Engaged machine that determines which other machines are influenced by its play for purposes of social isolation. The Disable list may be stored in at least one non-volatile computer readable medium operatively connected to the network and implemented by at least one computer processor. In the present embodiment, computer instructions are stored in a memory on the bridge board of the managing system. The process may also be implemented at each EGM by accessing instructions that are stored elsewhere on the network.

When a player engages a specific gaming machine, all machines on its Disable list are disabled. The following table shows the association list of each machine in FIG. 1B.

| Engaged Machine | Disabled Machine(s) |
|---|---|
| A | B |
| B | A, C |
| C | B, D |

-continued

| Engaged Machine | Disabled Machine(s) |
|---|---|
| D | C, E |
| E | D |

Note that only machine B is disabled when machine A is engaged. That's because Machine B is on the immediate right of machine A and there are no machines to the left of Machine A.

When machine B is engaged, both machines A and C are disabled because they are on the immediate left and right of machine B respectively. When machine C, is engaged, machines B and D are disabled for the same reasons. When machine D is engaged, machines C and E are disabled, because they are again, on the immediate left and right respectively. Target machine E is at the end of the bank, with no machine to its immediate right. Therefore, only Machine D is associated with Target machine E.

Figure 2:
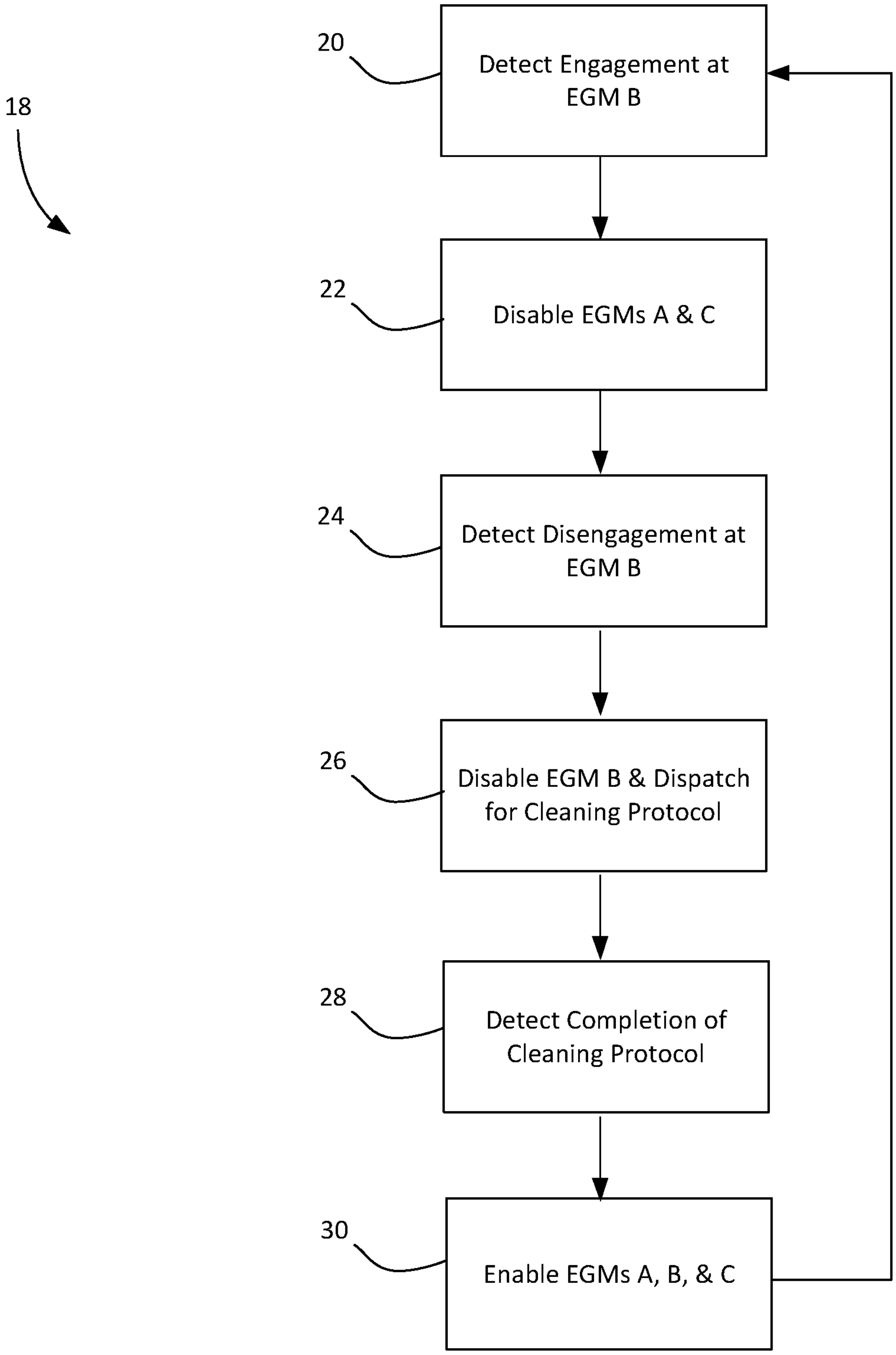
FIG. 2 is flow chart depicting the operation of one embodiment.

Turning now to FIG. 2, indicated generally at 18, is a computer implemented process of one embodiment of the current development. The process may be stored in at least one non-volatile computer readable medium operatively connected to the network and implemented by at least one computer processor. In the present embodiment, computer instructions are stored in a memory on at least one of the bridge board—and in one embodiment, all of the bridge boards—of the managing system. The process may separately or additionally be implemented at each EGM by accessing instructions that are stored elsewhere on the network.

Considering now operation of the present development under control of process 18, the initial state of a casino in which network 10 is installed might be a reopening after the casino has been closed as a result of a pandemic that required closing of all public spaces.

Before the first player appears, all of the EGMs on the network are enabled, i.e., ready for play. As a result, the first player is free to engage any of the EGMs to play, e.g., EGM B in FIG. 1B. The casino floor may be configured to implement a range of engagement determinations. For example, a machine could be considered Engaged when a player applies monetary or other value to the EGM in one of a variety of ways, e.g., a scannable ticket, inserting cash into a slot on the machine, or using a cashless system. This money is applied to the credit meter of the EGM and can take the form of cashable or noncashable credits and/or bonus entablements such as eligibility for additional machine payouts, additional promotional games, comps, prizes or other benefits. If the player is a member of the players' club, the player typically logs in—using, e.g., a player tracking card—so that his or her play can be tracked. The casino may be configured so that a machine engages the Disable list when funds are applied to the credit meter, when a player tracking card is inserted, when a player tracking card is recognized, when a player of a specific rank or tier is playing or any combination thereof.

The step of Engagement, by whatever method is defined, is depicted at 20 in FIG. 2. At 22, the process detects that Engagement is initiated in one of these ways and triggers a command to disable, i.e., make unplayable, both slot machines in the Disable list, EGM A and EGM C.

In one embodiment, this is accomplished by using a command transmitted to a port on the EGM from the bridge board in the managing system. The SAS protocol is commonly used to detect data from and issue commands to an EGM via a dedicated communications port on the machine. The SAS protocol 6.03 provides a general Shutdown Command that makes the game unplayable. The SAS 6.03 protocol also includes commands to disable specific games titles within the gaming machine. By using multiple commands to disable all game titles within a game, the equivalent effect of the general shutdown command. Either of these methods, among others, is compatible with the invention.

In another embodiment, the disablement is accomplished by using a different protocol such as the Gaming Standards Association G2S protocol or the Queensland Australia government QCOM protocol. Any protocol that includes commands to enable and disable a machine in some manner is useful with this invention. This can be achieved, through a communication protocol or through networked devices attached to the gaming machine that powers the machine on or off or enables or disables a hardware or software element that disables one or more aspects of the machine's operation or in any other way that renders an EGM unplayable.

When a slot machine is disabled using the SAS protocol, it typically remains lit but a notice appears on a display on the machine indicating it is out of service. Other players therefore quickly see that a disabled machine is not available to play. Thereafter the player at EGM B usually plays at least a few games with wagers decrementing the credit meter and wins incrementing it. It is possible that a player may log in or apply money to the credit meter and immediately decide not to play. In either event, after play or deciding not to play, the player Disengages, thereby ending the session. Determination of disengagement is configurable by a range of status indications, including credit meter balance, player card withdrawal, time since last game play, speed of game play and more. In one implementation, disengagement is configured as the removal of all credits from the credit meter, whether because the player cashed out or lost all of the play credits. In a second implementation, disengagement is configured as a period of time without play. In a third implementation, disengagement is configured as a credit meter balance below a minimum threshold AND a minimum period of time has passed since the last game play. One of ordinary skill in the art will realize there are many other possible and useful configurations.

In an embodiment of the invention, the casino defines the way in which Engagement and Disengagement are determined. Multiple definitions can be deployed in accordance with threat levels, business levels, time of day, day of week, building occupancy, player status, player preference and other types of considerations.

At 24, the managing system detects Disengagement using information taken directly from, or derived from the SAS port of the EGM and in response issues commands, at 26, to disable EGM B, the one just played. The Disengagement also triggers a dispatch command on the dispatch system, which appears on the mobile device of an attendant directing him or her to go to EGM B to accomplish a cleaning protocol while it is disabled. Depending upon the cleaning protocol, the attendant dispatched may also clean adjacent machines EGM A and C. The cleaning protocol may vary in detail of products and methods used to clean, the number of games to clean, the method of cleaning, etc. Multiple definitions can be deployed in accordance with threat levels, business levels, time of day, day of week, building occupancy, available labor, player status, player preference and other types of considerations.

In one embodiment predefined cleaning protocols are stored in a system memory. These protocols can be selected in response to the EGM location, level of threat, and number of engaged machines, among other things. The cleaning protocol is identified in the dispatch command and also appears on the mobile device of the attendant when he or she is dispatched to clean. As a result, when the attendant accepts a cleaning dispatch call, he or she knows what protocol to use and which machine or machines to clean.

Upon completing of cleaning protocol, the attendant uses their mobile device, at 28, to notify the dispatch system that the job is complete. This notification is detected by the managing system. If the cleaning protocol requires supervisory inspection, a new command to the dispatch system is issued calling a supervisor to inspect the machine in response to the completion notification. When the supervisor completes the inspection, or immediately after completion of the initial cleaning, if inspection is not required by the cleaning protocol, a SAS command is triggered to enable EGMs A, B & C at 30, making all three machines available for play.

As a result, the process returns to 20 to wait for the next player of EGM B, and all of the games on the network are again enabled and can be selected for play by a player with the same process being completed at each machine when play is initiated. When there are multiple players in the casino, they will notice that EGMs on either side of an EGM in play are disabled and cannot be played. As players leave games and attendants are dispatched to clean recently played games, which remain locked prior to cleaning, additional games will be available for play once cleaning is complete.

In most casino installations, a single gaming machine may be listed on the Disable list of two or more other gaming machines. When a conflict arises regarding whether a machine is to be enabled or disabled, the disabled state will prevail. For example, suppose machine B of FIG. 1 is on the Disable list of machine A and Machine C. A first player Engages machine A, causing machine B to be disabled. When the player Disengages, in one embodiment, an Enable command is issued to put machine B back into operation. But if a second player had already begun play at machine C, the system would not Enable machine until the second player also Disengages at machine C.

In other words, a gaming machine Z that is on the Disable list of multiple gaming machines BRIDGE, X and BRIDGE will only be enabled when none of the machine BRIDGE, X and BRIDGE are Engaged.

Figure 3:
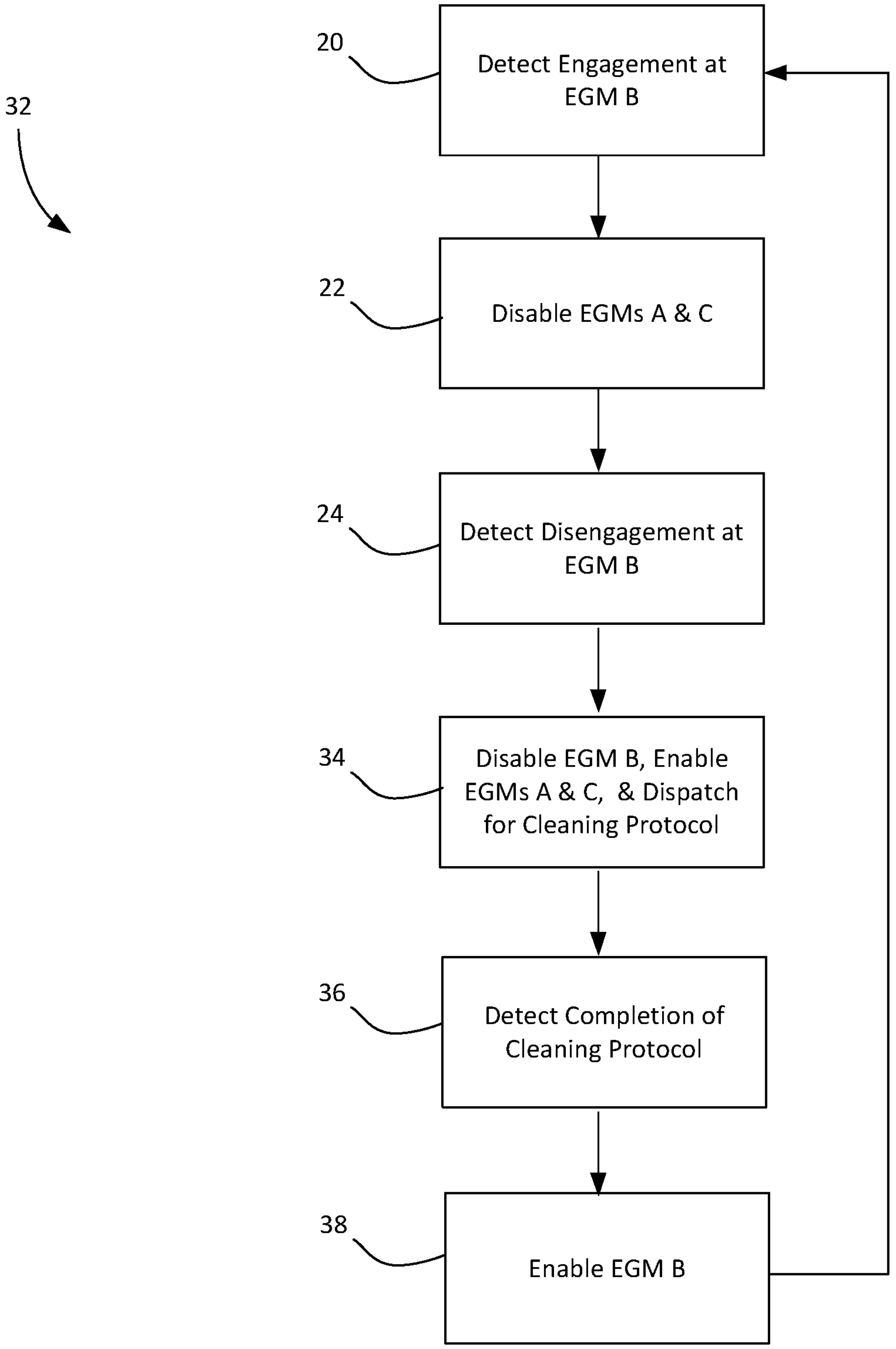
FIG. 3 is a flow chart depicting the operation of another embodiment.

Indicated generally at 32 in FIG. 3 is another embodiment of the present invention. Operations 20, 22, 24 in FIG. 3 are substantially the same as those bearing the same numerals in FIG. 2. In FIG. 3, however, at 32 the trigger initiated by Disengagement at 24, results in EGMs A and C being Enabled. While the dispatch, cleaning, and completion for EGM B is being conducted EGMs A and C are consequently available for play. When the attendant notifies the dispatch system via their mobile device that cleaning is completed, at 36, a trigger is generated that results in a SAS command to EGM B Enabling it at 38. Thereafter the process returns to 20 to wait for the next player of EGM B.

The present development can also be implemented with only the managing system and without the dispatch system. Detection of engagement and disengagement as well as commands to enable and disable are implemented as described above. After the managing system detects that an EGM is disabled or disengaged by the managing system as described above, floor attendants can be made aware that an EGM needs cleaning in several ways. For example, a floor attendant might observe that a player is leaving, or has left, an EGM that is now disabled. Or a floor attendant might see a disabled machine or several disabled EGMs in a row and proceed to implement the cleaning protocol.

In another way a floor attendant might observe that a player is leaving, or has left an EGM that is now disabled and summon a cleaner through a mobile communications device, using voice, text or other means. In another way, a casino employee who is a central dispatcher sees a machine become disabled on a monitor of a computer that is operatively connected to the network and that shows EGM status. He or she can then manually dispatch an attendant to the disabled EGM using a voice call to the attendant over a portable radio system. With reference to FIGS. 2 and 3, the Dispatch to Clean process at 26 in FIGS. 2 and 34 in FIG. 3 is accomplished by one of these manual methods.

Conversely, the present development can also be implemented with only the dispatch system and without the managing system. The dispatch system can detect when a card is inserted, which corresponds to engagement. The dispatch system can also detect when a card is removed, when play has stopped for a period of time, and can calculate when the credit meter goes to zero. One or any of these conditions in combination being available to define disengagement. As a result, a cleaner is dispatched upon detection of disengagement to clean. In this embodiment, the machines remain enabled at all times but cleaning using one of the cleaning protocols is automatically dispatched.

Regardless of how the attendant is dispatched, he or she arrives at the machine and cleans it, possibly cleaning nearby machines depending upon the cleaning protocol implemented. When cleaning is complete, the attendant can so indicate in several ways. For example, he or she can insert their employee card into the card reader, which when sensed indicates the cleaning protocol is complete. Alternately, the attendant may be required to enter their card and also enter a code or some other indication via the player tracking interface on the EGM thus indicating completion of the protocol. In still another way, the attendant can place a voice call to the dispatcher via his or her portable radio to inform the dispatcher that cleaning is complete. The dispatcher can then manually enable the EGM or EGMs using their computer. With reference to FIGS. 2 and 3, the Detect Completion of Cleaning process at 28 in FIGS. 2 and 36 in FIG. 3 is accomplished by one of these manual methods.

The system can be set up to permit operator configuration as between the embodiments of FIGS. 2 and 3 depending upon operator preference and any government mandate related to the appropriate extent of isolation. In addition, the operator can configure the system to disable more than the immediately adjacent EGM on either side of the EGM played, e.g., it can be set to disable two EGMs, or more, on each side of the EGM in play. In addition, for an application relating to players who are identified in the player tracking club and who historically gamble at a high level, a different number of adjacent machines could be selected for locking on either side of the player. As a result, some players may experience locking of different numbers of adjacent machines, depending upon government requirements and casino preferences. Such accommodations made to important players may be implemented even after requirements for social isolation to prevent spread of disease are no longer required. The number of adjacent machines to be locked for one or more of the players may be indicated in their player record and automatically implemented when the player logs in to the player tracking system as described above.

If a greater isolation distance is desired, the Disable list can be altered to include more machines in any of the embodiments using the managing system. The following table includes a Disable list for each of the machines in FIG. 1 but with two machines that are disabled on each side of the target machine.

| Engaged Machine | Disabled Machine(s) |
|---|---|
| A | B, C |
| B | A, C, D |
| C | A, B, D, E |
| D | B, C, E |
| E | C, D |

One of ordinary skill will recognize how a Disable list could be expanded to include machines located immediately behind the engaged machine or to include machines on a separate second bank of machines that happens to be physically close to one or more of the machines on the first bank. The Disable list provides complete flexibility in which machines are disabled for each machine that is engaged.

In another embodiment, multiple Disable lists are maintained for one or more gaming machines. A computer connected to the network chooses which Disable list to use based upon defined criteria decided upon during floor configuration or reconfiguration. For example, a casino could maintain one Disable list for periods of no threat or need for social isolation. This Disable list could have zero disabled machines associated with each engaged machine. A second list could serve in times when a low-level threat is present and a third for when a high-level threat is present. It may be desirable to configure additional Disable lists that are used for certain hours, weekdays, holidays, weekends, etc. As with any other embodiment using the managing system, this one can choose from multiple definitions of Enable and Disable described above. And any of the cleaning protocols may be implemented.

Additional Disable lists could be associated with weather conditions, if certain weather conditions create heightened risks. One or more disable lists could be associated with interior temperatures or other environmental conditions for the same reason.

Additional disable lists could be associated with how many customers are in the casino. At times of low crowds, isolation distance could be increased to encourage players to play away from others. As more people come in, the isolation distance could be reduced to a minimum acceptable distance by disabling fewer machines.

Additional disable lists could be associated with specific players. One example is for the high wagering gambler who is identified in the player tracking system as discussed above. In another example, when a player over the age of 65 or with known health conditions engages a machine, a Disable list with greater separation could be selected. Even in times of no threat, such a Disable list could be used to protect players with immune conditions or a desire for additional isolation space for purposes of minimizing distraction or risk or maximizing comfort.

What is claimed is:

1. A casino management system comprising:

a processor; and a memory device that stores a plurality of instructions, which when executed by the processor, cause the processor to:

responsive to receiving a player departing event signal representing an indication that a player has left an electronic gaming machine, cause a cleaning requirement notification associated with the electronic gaming machine to be provided to a casino staff member; and responsive to receiving a cleaning complete event signal representing an indication that the electronic gaming machine has been cleaned, cause a state of the electronic gaming machine to indicate that the electronic gaming machine has been cleaned.

2. The casino management system of claim 1, wherein the plurality of instructions, when executed by the processor, cause the processor to, responsive to receiving the player departing event signal, cause the electronic gaming machine to display an indication that the electronic gaming machine needs to be cleaned.

3. The casino management system of claim 1, wherein the plurality of instructions, when executed by the processor, cause the processor to, responsive to receiving the player departing event signal, cause the electronic gaming machine to be in a locked state.

4. The casino management system of claim 3, wherein the plurality of instructions, when executed by the processor, cause the processor to, responsive to receiving the cleaning complete event signal, cause the electronic gaming machine to be in an unlocked state.

5. The casino management system of claim 3, wherein the plurality of instructions, when executed by the processor, cause the processor to, responsive to receiving the cleaning complete event signal, cause the electronic gaming machine to display a cleaned message.

6. The casino management system of claim 1, wherein the plurality of instructions, when executed by the processor, cause the processor to, responsive to receiving the cleaning complete event signal, record that a cleaning process has been completed for the electronic gaming machine.

7. The casino management system of claim 1, wherein the plurality of instructions, when executed by the processor, cause the processor to, responsive to receiving a player occupying event signal representing that the electronic gaming machine is being played by the player, record that a cleaning process will be needed for the electronic gaming machine.

8. An electronic gaming machine comprising:

a display device;

a processor; and a memory device that stores a plurality of instructions, which when executed by the processor, cause the processor to:

responsive to detecting that a player has left the electronic gaming machine, send a player departing event signal representing an indication that the electronic gaming machine needs to be cleaned; and responsive to receiving an indication that the electronic gaming machine has been cleaned, display, via the display device, an indication that the electronic gaming machine has been cleaned.

9. The electronic gaming machine of claim 8, wherein the plurality of instructions, when executed by the processor, cause the processor to detect that the player has left the electronic gaming machine based on an occurrence of a player departing event comprising at least one of: a detection of removal of a player card from a card reader, or a lack of player activity at the electronic gaming machine for a period of time.

10. The electronic gaming machine of claim 9, wherein the plurality of instructions, when executed by the processor, cause the processor to detect that the player has left the electronic gaming machine based on the occurrence of the player departing event and a period of time after the occurrence of the player departing event.

11. The electronic gaming machine of claim 8, wherein the plurality of instructions, when executed by the processor, cause the processor to detect that the player has left the electronic gaming machine based on an occurrence of a player departing event and a period of time after the occurrence of the player departing event.

12. The electronic gaming machine of claim 8, wherein the plurality of instructions, when executed by the processor, cause the processor to, responsive to detecting that the player has left the electronic gaming machine, lock the electronic gaming machine to prevent another player from playing the electronic gaming machine while locked.

13. The electronic gaming machine of claim 8, wherein the plurality of instructions, when executed by the processor, cause the processor to, responsive to detecting that the player has left the electronic gaming machine, cause the display device to display an indication that the electronic gaming machine needs to be cleaned.

14. The electronic gaming machine of claim 8, wherein the plurality of instructions, when executed by the processor, cause the processor to, responsive to detecting that the player has left the electronic gaming machine, send the player departing event signal to a casino management system.

15. The electronic gaming machine of claim 8, wherein the plurality of instructions, when executed by the processor, cause the processor to receive the indication that the electronic gaming machine has been cleaned, based on an occurrence of receipt of a designated casino staff member card by a card reader.

16. The electronic gaming machine of claim 8, wherein the plurality of instructions, when executed by the processor, cause the processor to receive the indication that the electronic gaming machine has been cleaned, based on a receipt of a cleaning reset ticket and a rejection of the cleaning reset ticket.

17. The electronic gaming machine of claim 8, wherein the plurality of instructions, when executed by the processor, cause the processor to, responsive to receiving the indication that the electronic gaming machine has been cleaned, unlock the electronic gaming machine to enable another player to play the electronic gaming machine.

18. The electronic gaming machine of claim 8, wherein the plurality of instructions, when executed by the processor, cause the processor to, responsive to receiving the indication that the electronic gaming machine has been cleaned, send a cleaning event signal representing an indication that the electronic gaming machine has been cleaned.

19. An electronic gaming machine comprising:

a display device;

a processor; and a memory device that stores a plurality of instructions, which when executed by the processor, cause the processor to:

responsive to an occurrence of a cleaning event, cause the electronic gaming machine to be in a clean state in which the electronic gaming machine is not being played and has been cleaned;

responsive to an occurrence of a player occupying event, cause the electronic gaming machine to be in an active state; and responsive to an occurrence of a player departing event, cause the electronic gaming machine to be eligible to be in a locked state that requires an occurrence of a cleaning event before the electronic gaming machine returns to the clean state.

20. The electronic gaming machine of claim 19, wherein the plurality of instructions, when executed by the processor, cause the processor to, responsive to an occurrence of the player departing event, cause the display device to display an indication that the electronic gaming machine needs to be cleaned.

* * * * *